(12) United States Patent
Agner et al.

(10) Patent No.: US 6,485,277 B2
(45) Date of Patent: Nov. 26, 2002

(54) VALVE ARRANGEMENT AND PUMP FOR A GEAR SYSTEM

(75) Inventors: Ivo Agner, Bad Homburg (DE); Andreas Hampel, Bühl (DE); Martin Schindler, Baden-Baden (DE); Axel Fassbender, Offenbach (DE); Bernd Denfeld, Bad Homburg (DE)

(73) Assignee: Luk Fahrzeug-Hydraulik GmbH & Co. KG (DE)

( * ) Notice: Subject to any disclaimer, the term of this patent is extended or adjusted under 35 U.S.C. 154(b) by 0 days.

(21) Appl. No.: 09/909,692

(22) Filed: Jul. 20, 2001

(65) Prior Publication Data

US 2001/0041143 A1 Nov. 15, 2001

Related U.S. Application Data

(62) Division of application No. 09/173,218, filed on Oct. 15, 1998.

(30) Foreign Application Priority Data

Oct. 16, 1997 (DE) .......................................... 197 45 694

(51) Int. Cl.$^7$ .............................................. F04B 23/00
(52) U.S. Cl. ...................... 417/440; 137/115.3; 418/183
(58) Field of Search .......................... 417/440; 418/183, 418/186, 189

(56) References Cited

U.S. PATENT DOCUMENTS 5,630,318 A * 5/1997 Folsom et al. ................ 60/487

* cited by examiner

Primary Examiner—Teresa Walberg
Assistant Examiner—Thor Campbell
(74) Attorney, Agent, or Firm—Ostrolenk, Faber, Gerb & Soffen, LLP (57) ABSTRACT

The invention relates to a valve arrangement with a pressure limiting valve and a flow regulator valve, which comprises a flow regulator piston, having at least one first hydraulic resistor, distinguished in that the flow regulator valve's (5) flow regulator piston (15) has a split pressure return surface and in that the first part (ring surface (45)) of the pressure return surface is capable of working at a pressure p1 and a second part (annulus surface (31)) of the pressure return surface is capable of working at a pressure p2.

8 Claims, 6 Drawing Sheets

VALVE ARRANGEMENT AND PUMP FOR A GEAR SYSTEM

CROSS REFERENCE TO RELATED APPLICATIONS

This is a divisional of U.S. patent application Ser. No., 09/173,218, filed Oct. 15, 1998 in the name of Ivo AGNER, Andreas HAMPEL, Martin SCHINDLER, Axel FASSBENDER and Bernd DENFELD and entitled "VALVE ARRANGEMENT AND PUMP FOR A GEAR SYSTEM."

BACKGROUND OF THE INVENTION

The invention relates to a valve arrangement with pressure regulation and pressure regulation.

The pump supplies, for example, the gear system of a motor vehicle, particularly a revolutions-torque converter, and automatic or CVT gear system and/or a power steering system. The stream of liquid supplied to the consumer must be set to a certain amount. To this ends the main stage, the flow regulator valve, is used. The pressure limiting valve, which is also described as a pressure pilot, is used to set the maximum pressure of the medium supplied from the pump. It has emerged that the construction of the valve arrangement is, in many cases, costly and space-intensive. Often, different demands are made of the spatial arrangement of the pressure and suction connections of a pump containing a valve arrangement of the type discussed here. There are, for example in automatic gear system, tight spatial relations and/or there are mounting positions which are difficult to access. In addition, the connections and the main oil flow mechanism are pre-set in many cases. Moreover, in automatic gear systems, the valves are some distance away from the pump, meaning that the charging of the pump is poor, and the proportion of air in the oil is also large.

Therefore the aim of the invention is to create a valve arrangement of the type named at the beginning which does not exhibit these disadvantages.

SUMMARY OF THE INVENTION

In order to resolve this problem, a valve arrangement is proposed. The valve arrangement is characterized in that the flow regulator has a flow regulator piston with an initial hydraulic resistor which has a split pressure return surface. The first part of the surface of the pressure return surface is impacted with a pressure p1, and the second with the pressure p2. The split pressure return surface allows the mail oil flow through the flow regulator valve and also gives it a pressure limiting function, which would preferably be as a result of the pressure p2. This not only simplifies the guiding of the flow of medium, but also reduces the size of the pressure limiting valve. This means that the valve arrangement and a pump can be arranged within a single casing in confined spaces.

In order to resolve this problem, a valve arrangement is proposed which demonstrates the features named in claim 1. The valve arrangement is characterised in that the flow regulator valve has a flow regulator piston with an initial hydraulic resistor which has a split pressure return surface. The first part of the surface of the pressure return surface is impacted With a pressure p1, and the second with the pressure p2. The split pressure return surface allows the main oil flow to flow through the flow regulator valve and also gives it a pressure limiting function, which would preferably be as a result of the pressure p2. This not only simplifies the guiding of the flow of medium, but also reduces the size of the pressure limiting valve. This means that the valve arrangement and a pump can be arranged within a single casing in confined spaces.

An embodiment of the valve arrangement is preferred which is characterised in that the two parts of the surface of the pressure return surface are separated by a second hydraulic resistor, which can be arranged after the first hydraulic resistor—in the direction of flow and integrated into the flow regulator piston. Alternatively, the second hydraulic resistor can also be within the casing. This means that the structure is very compact and the guiding of the medium within the pump is simplified. In the preferred embodiment, the hydraulic resistors take the form of baffles.

In a particularly preferred example embodiment of the valve arrangement, the clutch mechanism takes the form of a plug which is inserted into a socket in the gear system. Preferably it is ensured that the clutch mechanism, i.e. the plug and the socket, is cylindrical in form. In particular, it is ensured that the outer diameter of the plug is chosen so that it is only very slightly less than the internal diameter of the socket, which means that the valve arrangement or the pump can be positioned particularly simply and precisely in relation to the great system.

A particularly preferred embodiment is characterised in that the sleeve surface of the cylindrical plug and/or the inner walls of the socket has/have a circular seal. This means that a seal can be achieved which is independent of the external characteristics of the housing of the valve arrangement or the pump and the housing or the flange of the gear system. There fore the seal of the connection between the valve arrangement and the gear system is independent of the size of the gap between the flange of the gear system and the housing of the valve arrangement.

The invention also relates to a pump for a gear system, particularly an automatic gear system, where the pump, a great control system, as revolutions/torque conversion unit and a valve for limiting the volume flow and/or limiting pressure and/or pressure modulation of the system pressure of the working medium of the great system are arranged within a common gear system casing. According to claim 24, the invention provides the valve allocated to the pump, specifically integrated within the casing of the pump. This is advantageous inasmuch as the particularly close arrangement between the pump and the valve allows short connections between these two components, which means that high volume flows can be supplied in the pump with a low level of loss. Oil flowing from the valve mechanism can also be used to charge the pump better, as the oil is returned directly via short routes.

For example, a flow regulator valve to limit flow volume and/or a pressure limiting or safety valve to limit pressure and/or a main pressure valve to modulate pressure can be used as the valve which is allocated to the pump. This valve or valves can also be externally influenced by an active component. What is known as a proportional valve should be mentioned specifically here, this can provide a modulated pre-control pressure for the valve, so that what is known as a pre-control circuit is formed. Alternatively, it can also be arranged so that the valve can be influenced by a magnet, a spring or any number of pressures present in the hydraulic system. This means that the line of the flow volume course can be set to be adjusted or influenced according to the operational status of the gear system.

Particularly preferred is an example embodiment of the gear pump where the valve arrangement in accordance with one or more of claims 1 to 22 is used for the valve.

Alternatively or additionally, what is known as a main pressure valve can be used.

In a particularly preferred embodiment, the gear pump takes the form of a wing cell pump or a roller cell pump, which is at least one strike, i.e. has one suction chamber and one pressure chamber each. This type of wing cell pump and roller cell pump is characterised by a stroke ring which influences the inward and outward motion of the wings or rollers. At least one suction channel of the pump is adjacent to a hollow in the stroke ring, so that the cross section of the suction channel is extended. This is a simple way of ensuring that the suction resistance for the working medium is reduced, so that there are slight low pressures in the pump area.

Particularly preferred is an embodiment where the hollow is open at the edges and where the open side is arranged opposite a suction pocket which can be formed, for example, in what is known as a pressure plate. Therefore the mouth of the hollow is in a lateral surface of the stroke ring, meaning that the cross section of the suction channel in the area of the suction pocket and the hollow is increased.

In a particularly preferred embodiment, the hollow which is open at the sides has a rounded section on at least one of the areas between its mouth and its limiting walls at the sides. Preferably, the area between the mouth and a side wall which lies within the large circle of the stroke ring should be chosen. It is particularly advantageous if—going from the mouth towards the side wall—there are two cut-out sections, so that the mouth continually climbs into the first section via an area, in order then to pass into a smaller rounded section. The transfer areas formed in accordance with the invention do not have any major influence on the stability of the stroke ring itself, as the notching effect is low here.

BRIEF DESCRIPTION OF THE DRAWINGS

In the following, the invention is explained in more detail with the aid of the drawings.

For the following description the basis premise is made, purely as an example, that the valve arrangement is working in conjunction with a pump. Generally, the valve arrangement can also be used for hydraulic controls, particularly of a gear system.

DESCRIPTION OF A PREFERRED EMBODIMENT

Figure 1:
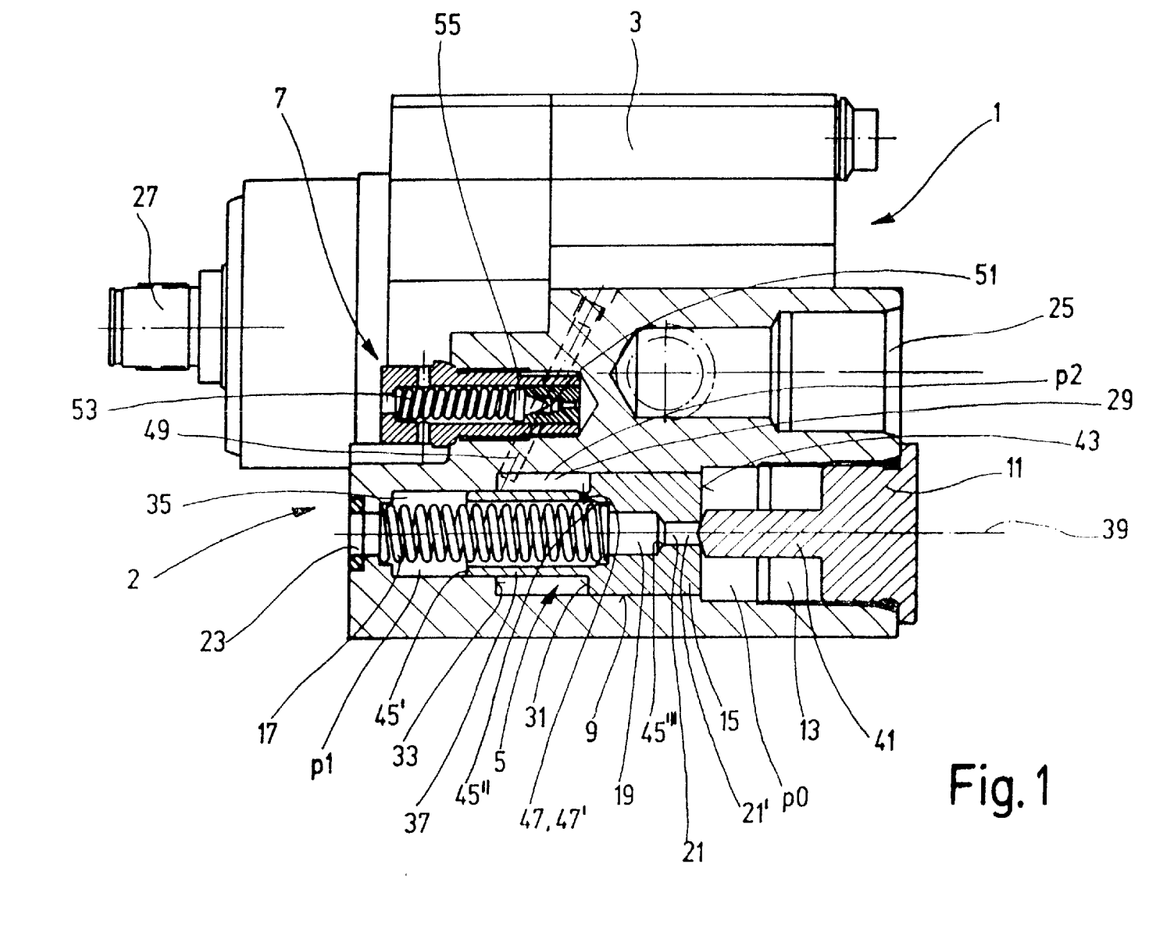
FIG. 1 Shows a top view of a partial section of a valve arrangement integrated into a pump.

The top view, as shown in FIG. 1, shows a partial section of a pump 1. From this drawing, it can be recognized that the pump 1 is integrated in a valve arrangement 2 within a housing 3. The valve arrangement 2 includes a flow regulator valve 5 and a pressure limiting valve 7. The flow regulator valve 5 is set in an opening 9 which goes through the housing 3, which opening is closed off on one side with a stopper 11 and forms a first pressure chamber 13 with this stopper 11. In the opening 9, which takes the form of a stepped opening, there is a flow regulator piston 15, which is positioned to be adjustable against the force of an elastic element which takes the form of a screw spring 17. The flow regulator piston 15 and forms an opening diameter of which is less than that of the opening 19. This baffle, which acts as a first hydraulic resistor 21' determines the consumer oil flow and is integrated into the flow regulator piston 15 in the preferred embodiment.

At the opposite end of the opening 9 to the stopper 11 is a pressure connection 23 which leads to a consumer which is not shown here.

At the opposite end of the housing 3 to the pressure connection 23 is a suction connection 25.

The representation in FIG. 1 also shows a shaft stump 27, via which the drive moment can be transferred to a pump unit in the housing 3. The shaft stump 27 is here on the side of the pressure connection 23, in order to guarantee both an extremely compact construction of the pump and secure pressure seal towards the outside. The flow regulator piston 15 divides the first pressure chamber 13 from a second pressure chamber 29 the diameter of which is here only smaller than the diameter of the first chamber 13 as an example. The second pressure chamber 23 is closed on one side by a annulus surface 31 of the pressure regulator piston 15 which faces away from the first pressure chamber 13 and on the other side by a shoulder 33, which is formed by a step in the opening 9 and forms a transition to a third pressure chamber 35, which is sealed by an extension 37 of the flow regulator piston 15 opposite the second pressure chamber 29 and is connected to the first pressure chamber 13 via the opening 19.

The first pressure chamber 13, which lies between the stopper 11 and the flow regulator piston 15, is sealed off from the opening 19 when the flow regulator piston is in the functional position shown in FIG. 1. This is because the stopper 11 preferably has a projection 41 which runs concentric to the central axis 39 of the opening 9 and seals the mouth of the opening 19 or its measuring baffle 21 if the pressure regulator valve 15 is forced to the right by the force of the screw spring 17 and hits the projection 41. It would also be possible to plan a different impact which would not have a sealing function.

A pressure p0 in the first pressure chamber 13 is exerted on the right front side 43 of the flow regulator piston 15. The surface of the front side 43, which is effective hydraulically, is largely formed from the cross-section surface of the flow regulator piston 15 minus the flow cross section of the measuring baffle 21. The pressure p1 in the third pressure chamber 35 is exerted on a stepped, proposed ring surface 45 of the flow regulator piston 15 which runs vertically to the central axis 39 of the flow regulator piston 15 which runs vertically to the central axis 39 of the flow regulator piston and is limited by the outer diameter of the pressure chamber 35 and the outer edge or outer diameter of the measuring baffle 21. Parts of the ring surface 45 are formed by the ring surfaces 45', 45" and 45'". The pressure p2 in the second pressure chamber 29 is exerted from the left onto the annulus surface 31, the width of which, measured in a radial direction to the central axis 39, corresponds to the width of the shoulder 33, measured in a radial direction, and is determined by the difference in the radii of the opening 9 in the area of the second pressure chamber 29 and in the area of the third pressure chamber 35. The annulus surface 31 would preferably be about the same size as the proposed stepped ring surface 45. However, it is possible to vary the relationship between the two surfaces (annulus surface 31 and ring surface 45). This makes it possible to influence, for example, the vibration absorption of the flow regulator valve 5. In addition, it can also vary the behaviour of the pressure regulation. The annulus surface 31 and the ring surface 45 form a resulting surface, which should preferably be exactly the same size as the front side 43. However, it is also possible to make the resulting surface and the front side different sizes. This means that the system pressure can be adjusted depending on the amount to be regulated.

FIG. 1 shows that the second pressure chamber 29 takes the form of a ring chamber which is concentric to the opening 19 and that the extension 37 of the flow regulating piston 15 separates the second pressure chamber 29 from the opening 19 hydraulically, whatever functional position the flow regulator piston 15 is in. In the wall of the extension 37, there is at least one opening, which preferably runs radial to the central axis 39 and acts as a baffle 47, i.e. as a second hydraulic resistor. This is therefore integrated into the flow regulator piston 15, so that the flow regulator valve is very compact in construction.

Therefore the second pressure chamber 29 is connected to the opening 19 hydraulically via the second baffle 47, the diameter of which is considerably less that that of the measuring baffle 21. The second baffle 47 comes after the measuring baffle 21—looking from the first pressure chamber 13.

The first pressure chamber 13 is impacted with the medium supplied from the pump unit. This passes via the measuring baffle 21 and the opening 19 to the third pressure chamber 35 and the pressure connection 23.

There is a fluid connection leading from the second pressure chamber 29 to a pressure chamber 51 in the pressure regulator valve 7 which is sealed by a valve body 55 impacted by the force of a screw spring 53. If the valve body 55 shifts to the left from the position shown in FIG. 1, a fluid connection from the pressure chamber 51 to a lower pressure level, for example to a tank, is released.

The basic functionality of a flow regulator valve and a pressure limiting valve is known, therefore it is not detailed here. It must only be stated that the flow regulator valve 5 serves to regulate the flow volume supplied by the pump unit via the pressure connection 23 to the consumer to a pre-set value where possible. The pressure limiting valve 7 serves to limit the maximum pressure with the pump. Maximum pressure can be reached when, for example, the fluid connection to the consumer is broken.

Figure 2A:
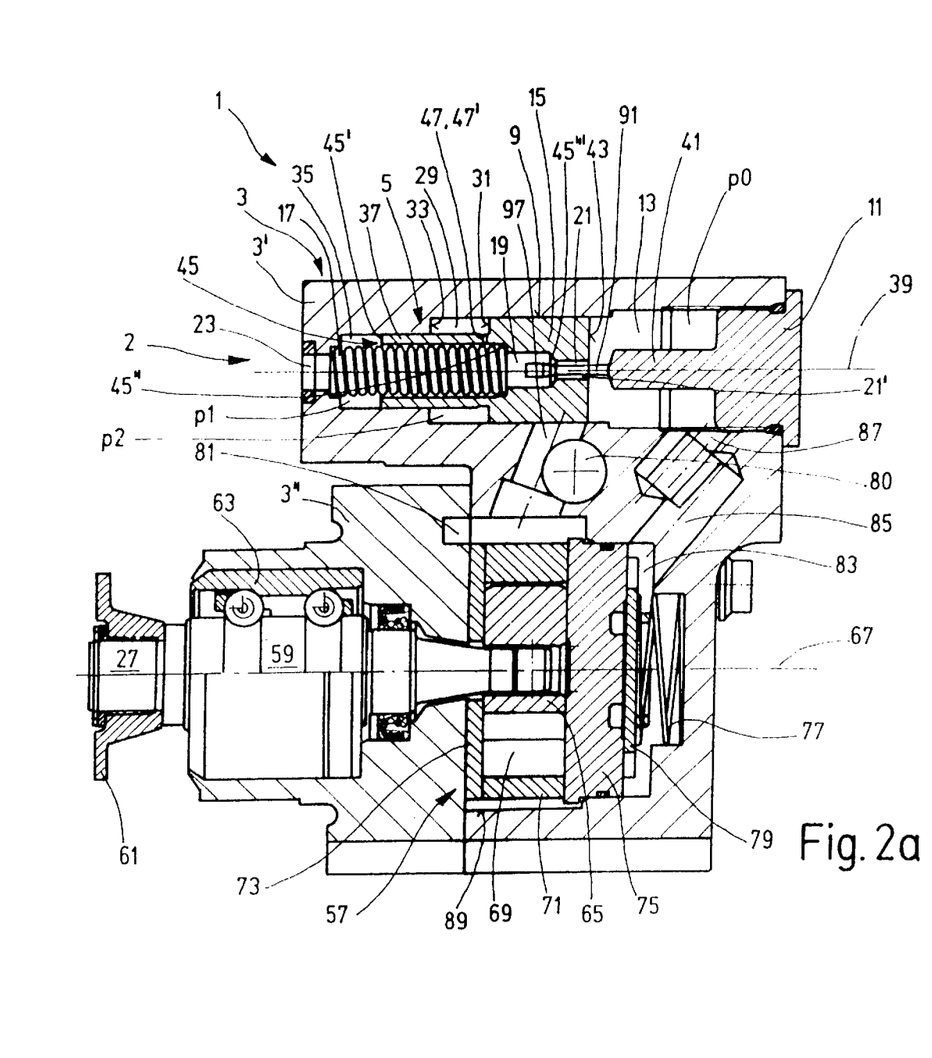
FIG. 2a Shows the pump shown in FIG. 1 as a longitudinal section.

FIG. 2a shows a longitudinal section of the pump shown in FIG. 1. The same parts are given the same numbers, therefore there is no need to Describe them further, as the explanation of FIG. 1 can be referred to.

The pump unit 57 mentioned above can be seen in FIG. 2a. Its construction is of no importance for the fitting and arrangement of the flow regulator valve 5 and the pressure limiting valve 7. Here, for example, a wing cell pump is shown which is driven by a shaft 59, to the shaft stump 27 of which can be attached a belt pulley 61 or something similar, in order to transfer a drive moment to the pump 1. The shaft is positioned in the housing 3 of the pump 1 using a special bearing 63. The free end of the shaft meshes with a rotor 65, which has slots which run in a radial direction to a turning axis 67 of the shaft 59, these slots have radially adjustable wings 69. The rotor 65 turns within a stroke ring 71 which has an inner surface which is almost elliptical and which the outer edges of the wings 69 slide against when the rotor 65 turns, forming part chambers of different volumes and therefore suction and pressure chambers.

To the right and left of the rotor 65, there are pressure plates 73 and 75 which seal the suction and pressure areas and which are pressed together with a spring 77. This comes into contact with a cold start plate 79 which lies on a surface of the pressure plate 75 which faces away from the rotor and forces the cold start plate against the pressure plate 75.

The function of a wing cell pump is basically known, therefore it is not detailed here.

The pump unit 57 sucks the medium to be pumped, for example hydraulic oil, via a tank connection 80—which has a fluid connection to the suction connection 25 and which is located close to the central axis of the pressure limiting valve 7 (FIG. 1)—and via a suction chamber 81 into a fourth pressure chamber 83, which passes into the first pressure chamber via a special fluid connection. For production reasons, this fluid connection is formed by openings 85 and 87, which run largely parallel to one another an cut another. Alternatively, the openings 85 and 87 can run towards one another at an obtuse angle. In this case it is important that the two openings 85 and 87 cut each other in such a way that a medium connection is made which allows the hydraulic oil pumped by the pump 1 to flow practically unhindered. Therefore a medium connection is made which largely has the same flow cross-section as openings 85 and 87.

Here, the housing 3 is made up two parts, a basic body 3' and a cover 3" which includes the bearing 63. The basic body 3' contains a hollow 89 which houses the pump unit 57. The first opening 85 can be inserted in the basic body 3' using the hollow 89, the second opening 87 using opening 9, if stopper 11 has not yet been set. This means that both openings 85 and 87 can be inserted into the housing 3 of the pump 1 in such a way that separate sealing stoppers are not required. A compact fluid a way that separate sealing stoppers are not required. A compact fluid connection between the fourth pressure chamber 83 and the first pressure chamber 13 can then be made easily.

From FIG. 2a it can be seen that the flow regulator valve is arranged in a fluid path, on one side of which is the inflow of the medium pumped by the pump 1 and on the other side of which is the pressure connection 23 for the consumer. In between the two is the outlet through which the medium can flow out if the pressure regulator valve 5 is activated.

In FIG. 2a, there is, for example, a continuation 91 marked which emerges from the projection 41 of the stopper 11, goes through the measuring baffle 21 and has a variable outer diameter. If the flow regulator piston 15 moves position, the measuring baffle 21 is made tighter to a greater or lesser degree by the continuation 91, depending on its outer diameter, so that variable courses of the volume flow pumped can be achieved via the revolutions n of the pump 57. Continuations of the type discussed here are well know, therefore are not detailed further.

In the representation shown in FIG. 2a, the flow regulator piston 15 has shifted from the its initial position, shown in FIG. 1, against the force of the screw spring 17 to the left, so that its front side 43 is arranged at a distance from the projection 41. In the functional position of the pressure regulating piston 15 of the pressure regulating valve 5 shown in FIG. 2a, there is a fluid connection from the fourth pressure chamber 83 to the third pressure chamber 35, and therefore to the pressure connection 23, via the openings 85 and 87, the first pressure chamber 13, the measuring baffle 21 and the opening 19. There is also a fluid connection between the opening 19 and the second pressure chamber 29 via the second baffle 47.

Figure 2B:
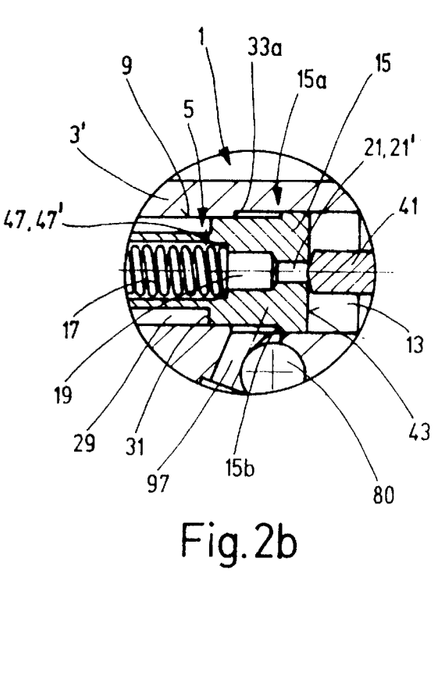
FIG. 2b Shows a section of a pump modified from that shown in FIG. 1.

FIG. 2b shows a section of an embodiment of a pump 1 which has been modified from that shown in FIG. 1 in the area of the flow regulator valve 5. Where they are shown, the same parts are given the same numbers as in FIG. 1, and a description of these parts is not necessary. It can be seen that a opening 9, which takes the form of a stepped opening, has a shoulder 33a, which is formed by another step in the opening 9. The flow regulator piston 15 has a ring step 15a so that an area with a larger diameter of the flow regulator piston 15 is introduced to an area greater than the opening 9 in diameter and an area with a smaller diameter of the flow regulator piston to an area with a smaller diameter of the flow regulator piston to an area smaller in diameter than opening 9. This staggering means that the annulus surface 31 is reduced in size compared to the embodiment shown in FIG. 1. This means that the resulting surface with the ring surface 45 (FIG. 1) and the annulus surface shown in FIG. 2b are smaller. This makes this resulting surface smaller than the front surface 43. The system pressure p0 is exerted on the difference area between the two surfaces (resulting surface and front surface 43). As already described in conjunction with FIG. 1, the amount regulated can be adjusted according to the system pressure, depending on the size of the difference area. This means that the beginning of the regulation can be varied using the size of the difference area.

There is a pressure in the suction area 81 and the outlet opening 97 which is exerted on one surface 15b of the ring stage 15a, but this pressure is low relative to the system pressure p0. This pressure generates a force which is exerted to the right in FIG. 2b, and works against the force generated by the system pressure p0 and represents an error value which does not, however, affect the regulator function of the flow regulator piston 15 significantly.

Figure 3A:
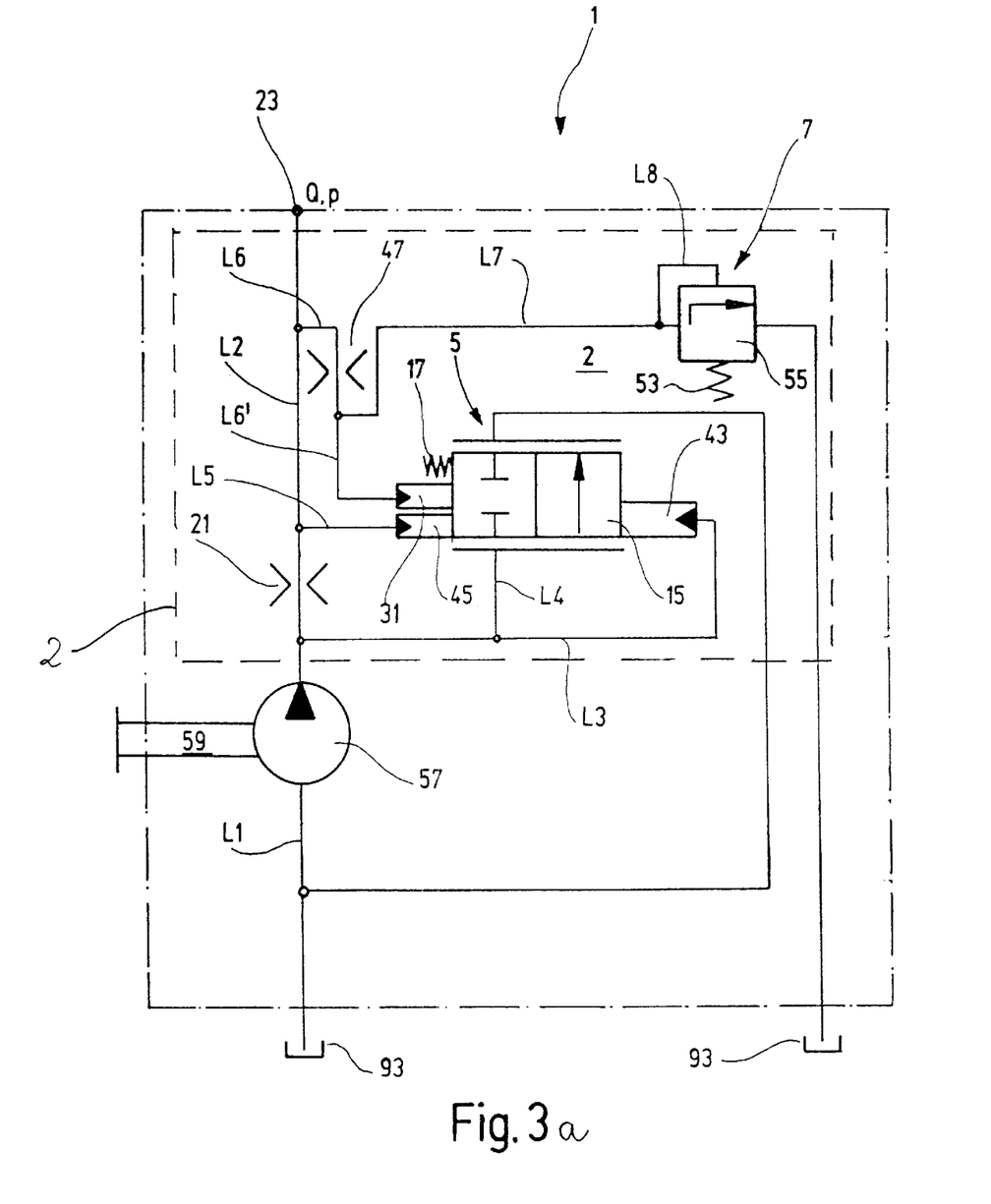
FIG. 3a Shows a basic connections diagram for the pumps shown in FIGS. 1 and 2.

The way that the pump 1 and the flow regulator valve 7 function can be seen in the main connections diagram shown in FIG. 5a. Parts that have been explained for FIGS. 1 and 2 are given the same number here. For these, the descriptions of FIGS. 1 and 2 should be referred to.

The pump unit 57 of the pump 1, which is marked by a square of dashed lines, is driven by the shaft 59. The valve unit 3 is surrounded by dashed lines. A medium, for example hydraulic oil, is introduced into the pump unit from a tank 93 via a pipe L1 and, from here, supplied to the pressure connection 23 vial a pipe L2. The flow volume is labelled Q, the pressure supplied p.

In pipe L2 is a measuring baffle 21. Before the measuring baffle, a pipe L3 branches off from the pipe L2. This leads the pressure in the pipe L2 before the measuring baffle to the right hand side 43 of the flow regulator piston 15. In the position shown in FIG. 3a, which corresponds to the position shown in FIG. 1, a connection pipe L4, which branches off from the pipe L3 and leads to pipe L1 via the flow regulator piston 15, is broken off. Before the measuring baffle 21, a pipe L5 branches off from pipe L2, which leads to the left side of the flow regulator piston 15 of the flow regulator valve and is impacted with the pressure p1 which is in the third pressure chamber 35 and exerted on the left ring surface of the flow regulator piston 15. Another pipe L6 branches off from L2 and leads to the left side of the flow retulator piston 15 via the second baffle 47. In the section of the pipe L6' after the baffle 47, there is the pressure p2, which is exerted on the annulus surface 31. In FIG. 3a, the screw spring 17 is also shown, which also exerts force from the left onto the flow regulator piston 15 of the flow regulator valve 5.

After the baffle 47, a pipe L7 branches off from the section of pipe L6' which leads to the tank 93 via the pressure limiting valve. The basic connection diagram shown in FIG. 3a shows the valve body 55 of the pressure limiting valve 7 which seals the pipe L7 when in the position shown in FIG. 3 and is impacted from tone side by the force of a screw spring 53 and on the other side by the pressure in the pipe L7 via a control or return pipe L8.

The following goes into the flow regulation function of the flow regulator valve 5 in more detail.

The flow volume Q, which is pumped from the pump unit 57 to the pressure connection 23 via the pipe L2, flows through the measuring baffle 21. Here it encounters a reduction in pressure. The pressure p0 before the measuring baffle 21 is also present in the first pressure chamber. It is exerted, via the pipe L3, on the opening right hand side 43 of the flow regulator piston 15 of the flow regulator valve 5. It exerts a force to the left in FIGS. 1 to 3a. The pressure in pipe L2 after the measuring baffle 21 corresponds to the pressure p1 in the opening 19 and in the third pressure chamber 35 or at the pressure connection 23. This pressure p1 is exerted on the left ring surface 45 of the flow regulator piston 15 of the flow regulator valve 5, the overall surface of which is less that of the front surface 45.

The pressure in the pipe L2 after the measuring baffle 21 is also exerted on the left annulus surface 31 via the pipe L6, the pipe section L6' and the second baffle 47. This pressure p1 produces a force which is exerted towards the right on the flow regulator piston 15 of the pressure regulator valve 5. The ring surface 45 and the annulus surface 31 together should preferably be exactly the same size as the front side 43 of the flow regulator piston 15. Therefore there is an equilibrium of forces between the force of the pressure on the right side of the flow regulator piston 15 and the sum of the two pressure forces which are exerted on the left side of the piston, i.e. on the annulus surface 31 and on the ring surface 45, and of the force of the screw spring 17.

The difference in force caused by a difference between the pressures acting on the right and left sides of the piston is dependent on the flow volume Q pumped by the pump unit 57. If the flow volume Q, and thus the pressure difference (p0–p1) increases at the measuring baffle 21, the pressure regulator piston 15 moves against the force of the screw spring 17 to the left. It can be seen from FIG. 2a that, if this sort of movement is made, the right front side 43 will end up revealing the mouth of the outlet 93, which produces a 'short circuit' between the first pressure chamber 13, the suction chamber 81 and the tank connection 80. The connection which creates the short circuit, which generally serves to charge the pump on the suction side, is marked as pipe L4 in FIG. 3a. From this diagram it can also be seen that if the flow regulator piston 15 shifts to the left, the block in the pipe L4 will end up being removed, creating a hydraulic connection between the pressure and the suction chamber of the pump unit 57.

If the flow regulator piston 15 allows hydraulic oil to flow into the suction chamber 81, the volume of oil flowing through the measuring baffle 21 does not increase further. This means that the pressure drop at the measuring baffle 21 does not drop any further, meaning that the pressure difference between the pressure p0 in the first pressure chamber 13 and the pressure p1 to the left of the measuring baffle 21 in the opening 19 reaches an almost constant level.

In this way a pressure balance is achieved which, in conjunction with the screw spring 17, limits the maximum flow volume of the pump 1.

The design of the continuation 91 of the projection 41 which projects into the measuring baffle 21 means that the surface of the resulting measuring baffle 21 can be varied in connection with the opening stroke of the flow regulator piston 15 and therefore the volume regulated can also be adjusted. This allows increasing and decreasing flow volume lines with different courses to be drawn up.

For the pure flow regulation function of the flow regulator valve 5, it is important that the pressure limiting valve 7 is closed. Therefore, for this function, no oil flows through out the fluid connection 49 and the pressure limiting valve 7. The pressure p2 in the second pressure chamber 29, when stationary, corresponds to the pressure p1 in the third pressure chamber 35. The second baffle 47 then generates no difference in pressure between the second pressure chamber 29 and the third pressure chamber 35. If it is dynamic, i.e. if the control piston is moving regularly, the second baffle 47 acts as an absorption element and influences the vibration behaviour of the flow regulation piston 15.

The following goes into the pressure limiting function of the flow regulator valve 5 in more detail.

If the operational pressure exceeds the value set be the pressure limiting valve 7, for example if the pipe leading to the consumer is blocked, the pressure limiting valve 7 opens. This means that the valve body 55 is shifted to the left with the force of the screw spring 53 (see FIG. 1) or is shifted down according to the representation in FIG. 3a. This frees a connection to the tank 93 meaning that hydraulic oil can flow from the second pressure chamber 29 to the tank via the fluid connection (see FIG. 1). In the representation shown in FIG. 3a, the hydraulic oil pumped by the pump unit 57 can flow into the tank 93 via the measuring baffle 21, the pipe L2, the pipe L6, the second baffle 47 and the pipe L7 (which is the same as the fluid connection 49) and the open pressure limiting valve 7. The pass-through diameter of the second baffle 47 is very much smaller than the pass-through diameter of the measuring baffle 21. Therefore there is a more significant difference in pressure (p1–p2) here. Because of the effects of the baffles, there is less pressure at the left annulus surface 31 than at the left ring surface 45 and at the right hand side 43. The pressure p0 provided by the pump unit 57, which is called the system pressure, increases until the pressure drop at the baffle 47 caused by the flow volume flowing out through the pressure limiting valve 7 is so large that the pressure balance, i.e. the force relationship between the forces exerted on the left and right sides of the flow regulator piston 15, shifts the flow regulator piston 15 to the left and the flow volume from the first pressure chamber 13 is led directly to the suction chamber 81 of the pump unit 57 via the outlet 97.

It has also been proved that, because of the split pressure return surfaces of the flow regulator piston 15, which are made up of the annulus surface 31 and the ring surface 45, the flow regulator valve 5, through the piston 15 of which the regulated oil stream flows, also has a pressure regulating function. Because of the pressured limiting valve 7, an equally low volume of oil must flow through the second baffle 47. The resulting difference in pressure shifts the flow regulator piston 15 or opens up a connection between the first pressure chamber 13 and the outlet 97; this short circuit connection is marked as L4 in FIG. 3a. In this function position, a large controlled volume can flow through the flow regulator piston 15, meaning that the system pressure cannot increase further.

This all makes it clear that the pump is relatively simple and compact in structure. It is possible to arrange the flow regulator piston parallel to the shaft 59 and have the pressure outlet 23 on the side of the shaft stump 27. The flow volume provided by the pump 1 flows through the flow regulator valve 5 in a straight line, meaning that the flow paths are short. This is made possible by the fact that the measuring baffle 21 is integrated into the control piston 15, meaning that the main flow volume Q can pass through the flow regulator valve 15. In addition, the flow regulator valve 5, in conjunction with the annulus surface 31, allows the pressure limiting valve to act as a pilot stage. It is possible to lead the fluid connection between the pressure outlet of the pump unit 57, i.e. the fourth pressure chamber 83, and the first pressure chamber 13 through the openings 85 and 87, which are completely within the housing. This is another factor in the simple, compact construction of the pump 1.

Figure 3B:
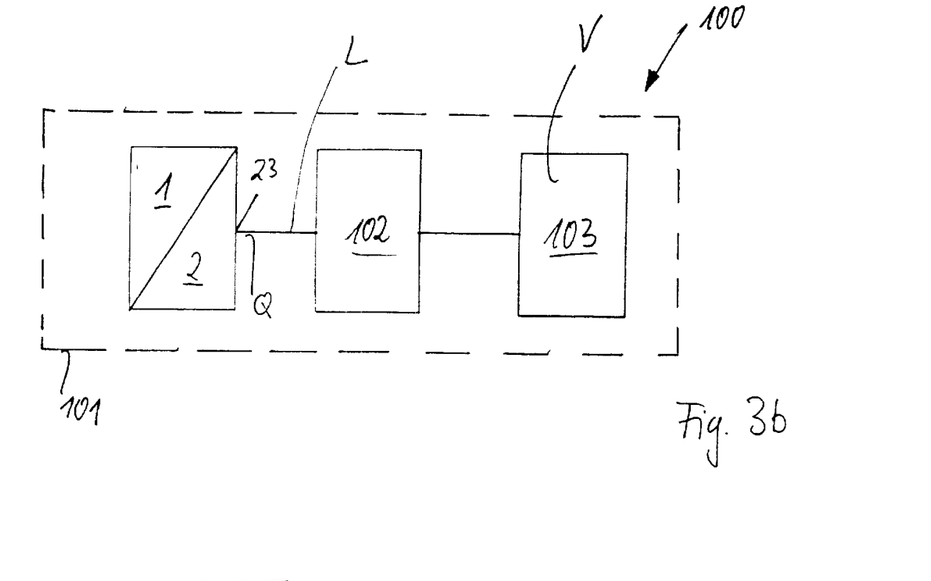
FIG. 3b Shows a block connections diagram for a gear system.
Figure 4:
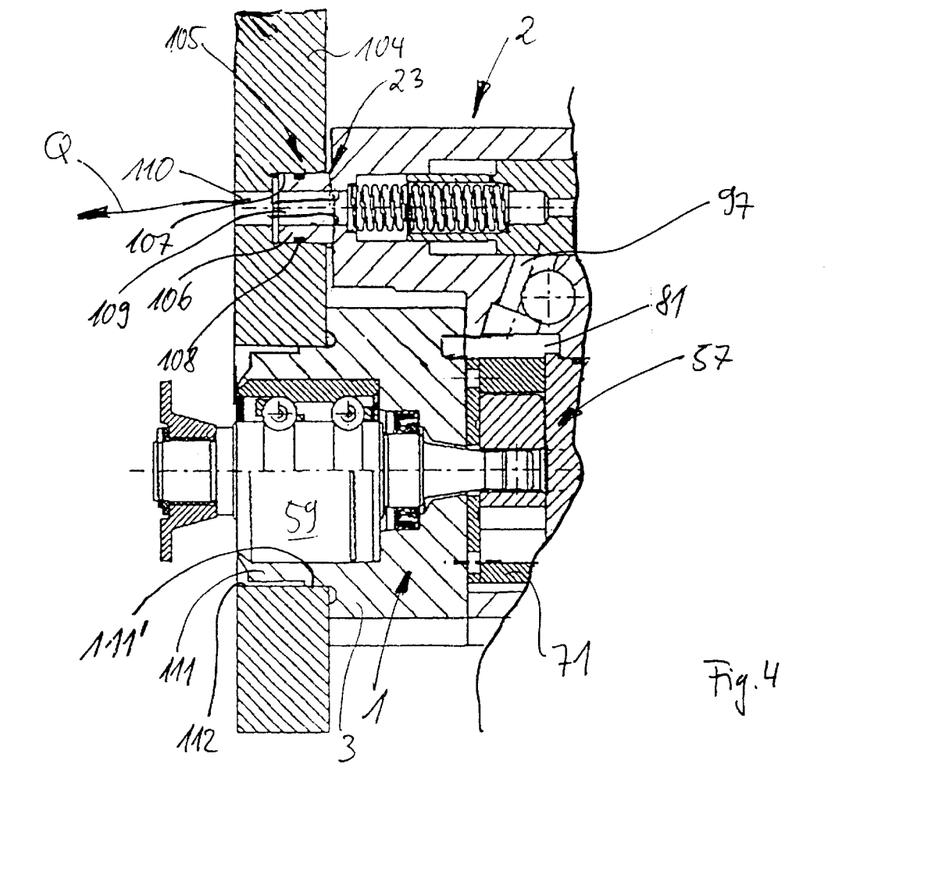
FIG. 4 Shows a second embodiment of a pump allocated to the valve mechanism shown in FIG. 1.

FIG. 3b shows a block connection diagram of a gear system 100, which would preferably be an automatic gear system. A housing 101 of the gear system 100 is shown in dashed lines, the housing 101 contains both the pump 1 and the valve arrangement 2. In addition, a control unit 102 is also housed in the housing 101, this serves to control a consumer V, particularly a revolutions/torque converter 103. The control unit 102 is connected to the pressure connection 23 of the valve arrangement 2 via a pipe 1, meaning that the main flow volume Q can be moved on to the converter 103 by the control unit 102, depending on the status of the control unit 102. It is particularly planned that the pump 1 and the valve arrangement 2 should be attached to a flange 104, which can form a part of the housing for the control unit 102, as shown in FIG. 4. However, the pump 1 or the valve arrangement 2 can also be connected to the control unit 203 via pipes in the great system housing 101 or via hollow pipes. Parts which are the same as those in FIGS. 1 to 3b are given the same number in FIG. 4, therefore explanations are only made in the following where there are difference.

There is a clutch mechanism 105 at the pressure connection we, this can take the form of a cylindrical plug 106. The plug 106 is inserted into a socket 107 located in the flange 104. The socket 107 is also cylindrical in form and has an internal diameter which is slightly greater than the external diameter of the plug 106. In the sleeve surface of the plug 106, there is s circular nut which contains a seal 108, meaning that working medium flowing out of the pressure connection 23 cannot flow over the socket 107. Of course there can also be a seal on the internal walls of the socket 107. The clutch mechanism 105, or the plug 106, is hollow in form so that a supply channel 109 with its mouth in a channel 110 can be realised, this leads to the control unit 102 of the gear system 100.

The housing 3 of the pump 1 also has a continuation 111 with a seat 111', through which the shaft 59 for the pump unit 57 runs. The continuation 111 and the seat 111' are preferably cylindrical in form and run through a gap 112 of an appropriate cross-section in the flange 104. The continuation 111 and the clutch mechanism 105 allow the pump 1 or the valve arrangement 2 to be positioned exactly relative to the flange 104. They also form security against twisting.

As the valve arrangement 2 is directly adjacent to the pump, the pipe sections between the pressure chamber 83 (FIG. 2a) and the first pressure chamber 12 of the valve arrangement 2 are shorter. In addition, the outlet opening 97 is relatively short, meaning that the hydraulic oil contained in the outlet opening 97 can better be used to charge the pump 1. Also, the relatively short pipes between the pump 1 and valve arrangement 2 mean that there is little hydraulic resistance and high flow volumes can be used to charge the pump 1 with low loss levels.

Instead of the valve arrangement 2, the pump 1 can, for example, be allocated a separate flow regulator valve to limit the flow volume. Additionally or alternatively, a pressure limiting or safety valve and/or a main pressure valve to modulate the pressure of the main flow volume Q can be used. What is decisive is that—irrespective of the valve types used—there are short pipes between the pump and the valve or valve arrangement, so that high flow volumes can be supplied with low loss levels and the oil flowing in the outlet opening 97 can be used to charge the pump 1 better.

The pump 1 is specifically designed to be used in a gear system as a wing cell pump or roller cell pump. Pumps of this type are generally know, therefore known parts are not detailed further here.

The pump 1 has a stroke ring 71, on the inside of this there is a rotor 65 (FIG. 2a). The rotor houses the wings in wing cell pumps and the rollers in roller cell pumps, these slide along the inside 113 of the stroke ring 71. What are known as pressure plates can be allocated to the side surfaces of the stroke ring 71, forming a pump chamber 114. Suction pockets, which are known in themselves, can be housed in the pressure plates, the working medium can be sucked through a suction channel in these from a tank when the rotor is turning.

Figure 5:
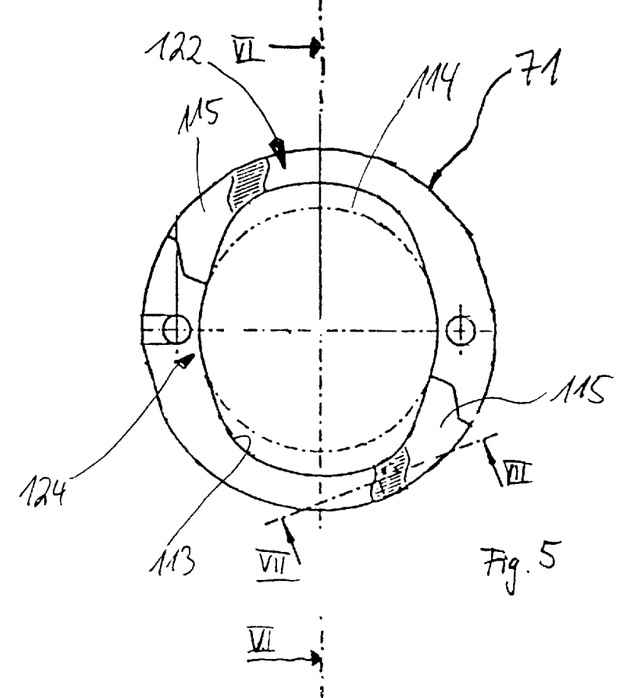
FIG. 5 Shows a side view of a stroke ring from a wing cell pump or a roller cell pump.

In the stroke ring 71, there are two hollows 115 opposite one another which are allocated to a suction pocket and therefore to the suction chamber of the pump. The hollows 115 mean that the cross section of the suction channel in question is increased, improving the known injector effect of the pump. In addition, the hollows 115 reduce the suction resistant of the pump. There is also a relatively large amount of air in the working medium in gear system pumps, so the increased cross section of the suction channel means that sufficient oil or the required amount of the working medium can be pumped through anyway.

Figure 6:
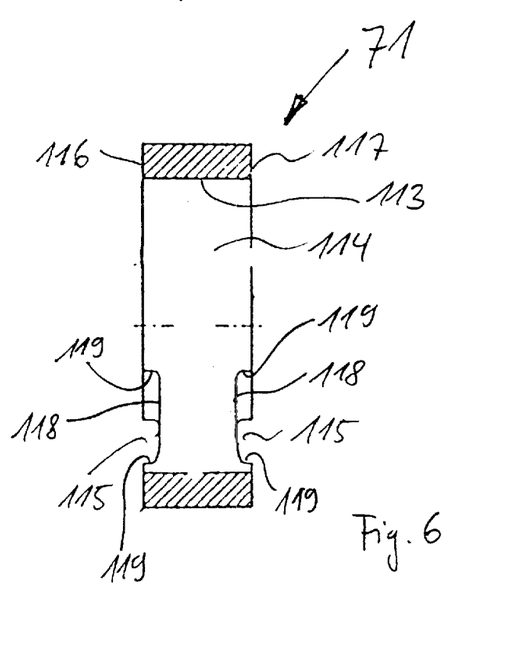
FIG. 6 Shows a section view along line VI—VI in FIG. 5.

Preferably each side surface 116 or 117 of the stroke ring 71 (FIG. 6) should have two hollows 115 for two-stroke pumps, although in FIG. 6 the position of the section line means that only the bottom hollows 115 are shown. The sides of each hollow 115 are open relative to the side surface 116 or 117 allocated to it and has an indentation 118 and lateral walls 119.

Figure 7:
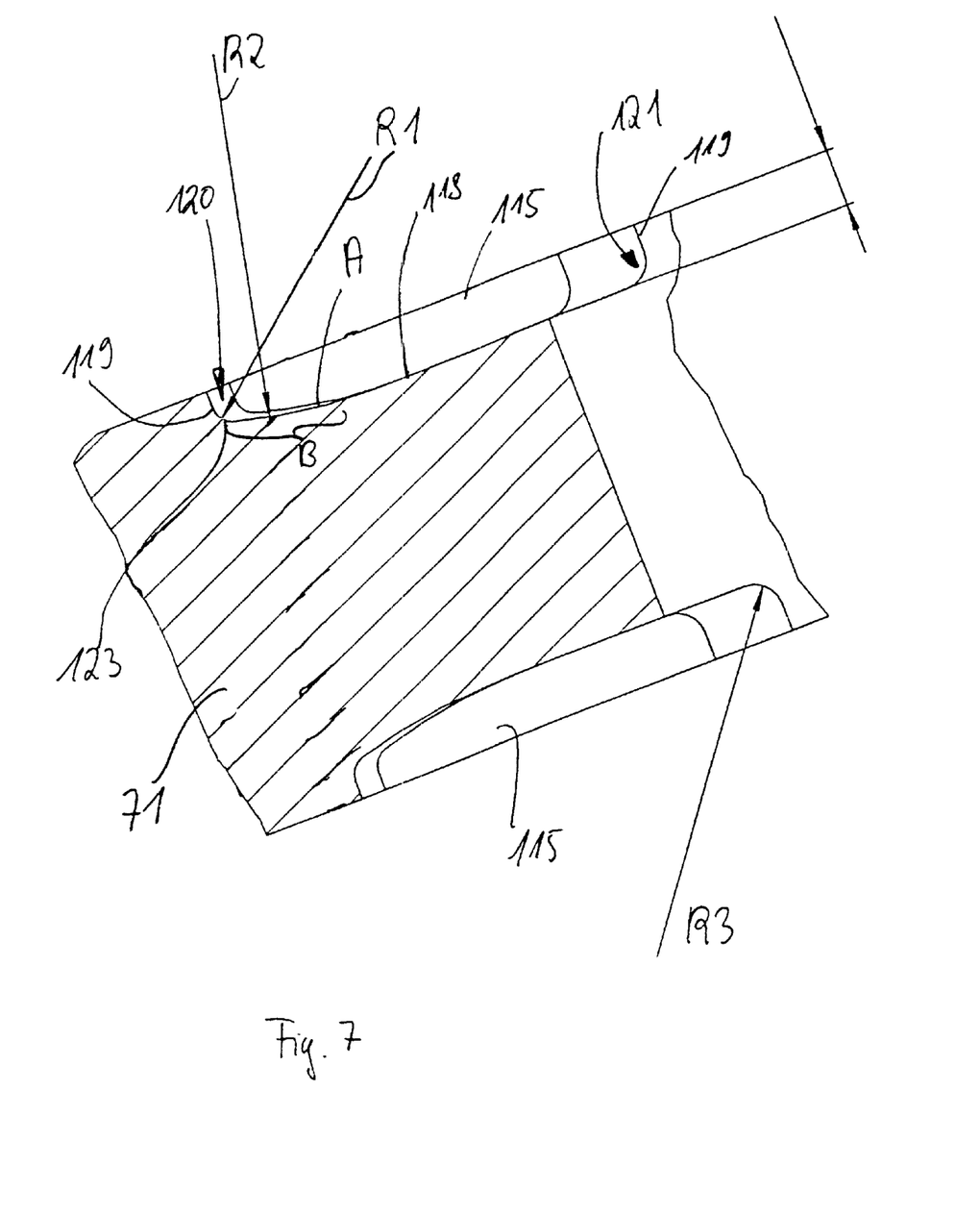
FIG. 7 Shows a section view along line VII—VII in FIG. 5.

According to FIG. 7, the hollows 115 have a passage 120 and 121 between the indentation 118 and the lateral walls 119. It has proved particularly advantageous if the passage 120 has a rounded section 123 in what is known as the large circle areal 122 of the stroke ring 71, the radius of this rounded section R1 is between 0.6 mm and 0.8 mm. It has proved to be particularly advantageous if the radius is 0.7 mm, as the notching effect in the passage 120 is low. The rounded section 123 adjoins the wall 119, and is adjoined by an area B which goes down to the indentation 118. It is particularly planned that there is also a rounded section in the area B, the radius R2 of which can be about 17 mm. The area B adjoins the indentation 118 of the hollow 115. Therefore it is possible that—going from the indentation 118 in the direction of a limiting wall 119—there are two cut-out sections, where the first cut-out section A continually increases over the area B, and then passes into a second cut-out section in the rounded section 123 with the radius R1; which then passes into the limiting wall 119 in the passage 120. The cut-out section A can either have a radius R2 in the area B or can go up in a straight line.

In the preferred embodiment, the other passage 121 between the limiting wall 119 and the indentation 118 has a radius R3 which is preferably 1 mm. This passage 121 is located in what is known as small circle area 124 of the stroke ring 71.

What is claimed is:

1. A pump system for a gear system in a vehicle comprising:
   a pump, a transmission control unit, a consumer and a valve located in a gear system casing wherein:
   the valve is operable to at least one of limit pressure, regulate flow and modulate pressure of a fluid medium in the gear system;
   the pump is a one-stroke pump and is at least one of a vane pump and a roller type pump, and has a stroke ring for influencing the movement of the at least one of vanes and rollers and has a suction channel for receiving the fluid medium; and
   the stroke ring has at least one hollow adjacent to the suction channel and extending across a section of the suction channel.

2. A pump as per claim 1, wherein the valve is a main pressure valve.

3. A pump as per claim 1, wherein the at least one hollow is open-sided and flows into a side surface of the stroke ring.

4. A pump as per claim 1, wherein the at least one hollow has an indentation and lateral walls with at least one passage therebetween and the at least one passage is rounded.

5. A pump as per claim 4, wherein the stroke ring includes a circle, and the at least one passage lies in the circle of the stroke ring.

6. A pump as per claim 4, wherein a first section of the hollow rises from the indentation towards the lateral wall in a fillet radius with a specified radius.

7. A pump as per claim 6, wherein the fillet radius has a radius of from about 0.6 mm to about 0.8 mm.

8. A pump as per claim 6, wherein the fillet radius has a radius of about 0.7 mm.

* * * * *